United States Patent
Kesari et al.

(10) Patent No.: US 11,444,932 B2
(45) Date of Patent: *Sep. 13, 2022

(54) DEVICE VERIFICATION OF AN INSTALLATION OF AN EMAIL CLIENT

(71) Applicant: AirWatch LLC, Atlanta, GA (US)

(72) Inventors: Adarsh Kesari, Atlanta, GA (US); Martin Kniffin, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 487 days.

This patent is subject to a terminal disclaimer.

(21) Appl. No.: 16/516,736

(22) Filed: Jul. 19, 2019

(65) Prior Publication Data

US 2019/0342279 A1 Nov. 7, 2019

Related U.S. Application Data

(63) Continuation of application No. 15/451,586, filed on Mar. 7, 2017, now Pat. No. 10,375,052.

(51) Int. Cl.
| | |
|---|---|
| *H04L 29/06* | (2006.01) |
| *H04L 9/40* | (2022.01) |
| *H04W 12/06* | (2021.01) |
| *H04W 12/069* | (2021.01) |
| *H04L 51/42* | (2022.01) |
| *H04W 12/71* | (2021.01) |

(52) U.S. Cl.
CPC .......... *H04L 63/0807* (2013.01); *H04L 51/42* (2022.05); *H04L 63/0272* (2013.01); *H04L 63/0853* (2013.01); *H04W 12/068* (2021.01); *H04W 12/069* (2021.01); *H04L 63/068* (2013.01); *H04L 63/0823* (2013.01); *H04W 12/71* (2021.01)

(58) Field of Classification Search
CPC ............. H04L 63/1416; H04L 63/1408; H04L 63/1441; H04L 63/1458; G06F 21/552
USPC .......................................................... 726/7
See application file for complete search history.

(56) References Cited

U.S. PATENT DOCUMENTS

| | | |
|---|---|---|
| 2009/0004951 A1 | 2/2009 | Roman et al. |
| 2009/0113543 A1* | 4/2009 | Adams .................. H04L 9/3271 726/20 |
| 2015/0007291 A1* | 1/2015 | Miller .................. H04W 12/062 726/7 |
| 2016/0269898 A1 | 9/2016 | Kueh |

\* cited by examiner

*Primary Examiner* — Evans Desrosiers
(74) *Attorney, Agent, or Firm* — Thomas | Horstemeyer LLP (57) ABSTRACT

Disclosed are various examples for single-sign on by way of managed mobile devices. For example, an identity provider service can receive a request for an identity assertion from an email client executed in a client device. The identity provider service can then detect a platform associated with the client device. The device and the user's identity can be authenticated so that an IT administrator can specify that only authorized devices can access email using the email client.

20 Claims, 7 Drawing Sheets

FIG. 6

DEVICE VERIFICATION OF AN INSTALLATION OF AN EMAIL CLIENT

CROSS-REFERENCE TO RELATED APPLICATION

This application is a continuation of and claims the benefit of U.S. patent application Ser. No. 15/451,586, entitled "DEVICE VERIFICATION DURING THE CONFIGURATION OF AN EMAIL CLIENT," and filed Mar. 7, 2017, which is hereby incorporated by reference in its entirety.

BACKGROUND

Users in an enterprise or corporate environment are often issued or use their own mobile devices to access their enterprise email. An email client is often installed on the device by the user or an information technology (IT) administrator to facilitate access to the user's email. To access email, the user typically must provide a username and password, and in some cases, a two-factor authentication token, to authenticate access to email by his or her mobile device. However, with username and password access to email, the IT administrator can be restricted in his or her ability to limit or control with which mobile devices the user is accessing his or her email.

Limiting access to email to certain mobile devices can be desirable so that an IT administrator can ensure that a user is not accessing his or her corporate email on a device that is unapproved or that is not managed by the IT administrator. For example, an unmanaged device might have unapproved or malicious applications installed on the device that can compromise data security within an enterprise. Accordingly, an IT administrator might wish to restrict access to corporate email to a particular mobile device. The particular device might be a managed device that is owned and issued by the enterprise to the user or a device that is enrolled with a management service. However, some email services might not provide a mechanism to authenticate a mobile device that is accessing a user's email in addition to authenticating the user's identity.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing a single sign-on experience for users of an email client on mobile devices. The present disclosure also relates to verifying that an email client that is attempting to access an email service of a user is installed on an authorized mobile device. With a single sign-on experience, a user enters or obtains a single set of security credentials for an account and, upon authentication, the user is able to access multiple different applications and services that are linked to that account. One example of such an application is an email client. Multi-factor authentication can also be employed where the user is required to provide a combination of knowledge, possession, or biometric authentication factors. As contemplated herein, the term "single sign-on" can include scenarios in which a user is required to re-enter security credentials due to session timeouts, inactivity periods, suspicious activities, or other events that could cause authentication of the user to be doubted.

Email is one of the most often used applications on a mobile device in a corporate or enterprise environment. In modern corporate, education, or other enterprise environments, moving email services to a hosted solution is becoming prevalent. One example of a hosted email solution in which email services are provided by a third party is OFFICE 365. In an OFFICE 365 deployment, an information technology (IT) administrator can create an account for users within OFFICE 365 that they can access using their corporate or enterprise login credentials in a single sign-on deployment. To accomplish a single sign-on deployment, OFFICE 365, or any third-party email service, can federate authentication of users to an identity provider associated with the enterprise. Accordingly, a user can authenticate his or her identity to an application or website associated with the identity provider service, which can indicate to the email service whether the user is authorized to access the email service.

Accordingly, in examples of this disclosure, as a part of the authentication process, the identity provider can also authenticate whether the mobile device from which the user is attempting to access the email service is an authorized device. Authentication of the user's mobile device can be accomplished by way of a device-specific credential, which can include a device certificate or token that is provided to the mobile device when the user enrolls his or her mobile device with a management service as a managed device.

However, certain email clients, such as OUTLOOK MOBILE, employ an authentication and data synchronization protocol that may not directly provide a device identifier that allows for the device to be identified by an identity provider. OUTLOOK MOBILE, in particular, is a popular email client that is often used or demanded by IT administrators or users for use with a third party email service. OUTLOOK MOBILE and other email clients might employ EXCHANGE WEB SERVICES (EWS) to communicate with the email service for messaging between the email client and one or more servers provided by the email services. In some implementations, a mail service or server in combination with a delegated authentication framework fails to provide a way out-of-the-box to identify a particular mobile device, unlike EXCHANGE ACTIVESYNC, which is a protocol used by other email clients, such as third party clients and legacy email clients.

Therefore, as the prevalence of EWS as a data synchronization and message protocol between email clients and email servers or services grows, a way to identify and authenticate mobile devices in addition to user identity is an increasingly prevalent problem that examples of this disclosure can solve.

Figure 1A:
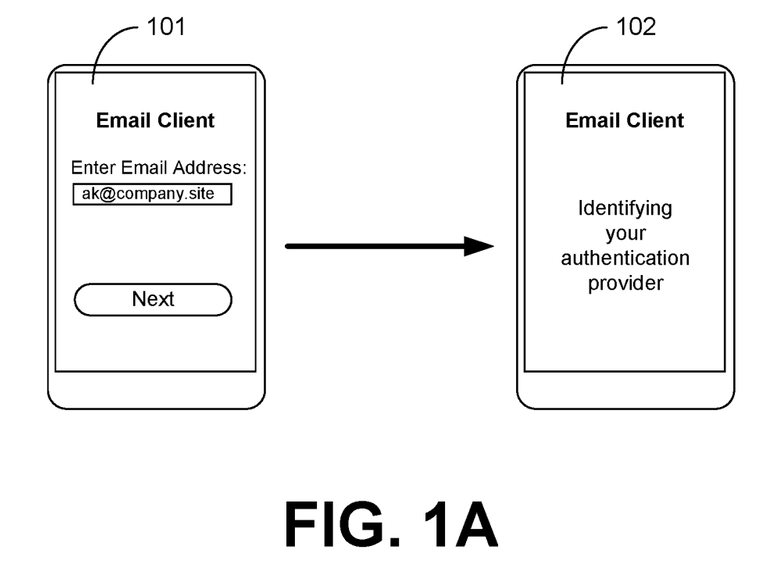
FIGS. 1A-1C are drawings illustrating example scenarios according to various examples of the disclosure.

With reference to FIG. 1A, shown is a pictorial diagram of an example single sign-on scenario in which an email client, such as OUTLOOK MOBILE. In the scenario depicted in FIG. 1A, it is assumed that the mobile device is enrolled as a managed device with a management service and that the user has provided his or her authentication credentials to a management service or an identify provider through an application or a web-based authentication challenge. At 101, a user launches an email client that can allow the user to access his enterprise email from an on-premises email server or a third party email service such as OFFICE 365. The email client can provide a user interface configured to receive an email address or user identifier of the user for his or her email. Specifically in this example, the user interface includes a form configured to receive an email address with which the email service can identify a user account of the user. Other security credentials or authentication factors can be elicited in other examples. In other examples, the email client might not prompt for any user identifier and attempt to identify and authenticate the user solely based upon a device-specific credential that is present on the device. After the user enters the information, the user selects a submission component.

Upon entering a user identifier, the email client can provide the user identifier to a server component associated with the email service at 102. The email client can indicate to the user that the email client or email service is attempting to determine how the user account of the user should be authenticated. An IT administrator associated with the user's enterprise can configure the email service to federate authentication to an identity provider of the enterprise that authenticates user access to various services of the enterprise. As shown in FIG. 102, a discovery service associated with the email client or email service can identify an email server associated with the user's account, which can receive the user identifier and redirect the email client to one or more server internet protocol (IP) addresses through which the email client can access the user's email that is hosted by the email service. However, before providing access to the user's email, the user's identity can be verified by the email service.

Because authentication of the user's identity is federated to an identity provider, the email service or server can redirect the email client to the identity provider so that the email client can obtain an identity assertion that can be presented to the email service. In one example, the email service can initiate the Security Assertion Markup Language (SAML) process by redirecting the email client to an identity provider specified in a SAML redirect sent from the email service to the email client. Accordingly, reference is now made to FIG. 1B. At 103, the email client can indicate that the email service is redirecting the email client to an identity provider so that the email service can obtain an identity assertion from the identity provider. The identity assertion can be used by the email client to authenticate its access to the requested user account within the email service.

Figure 1B:
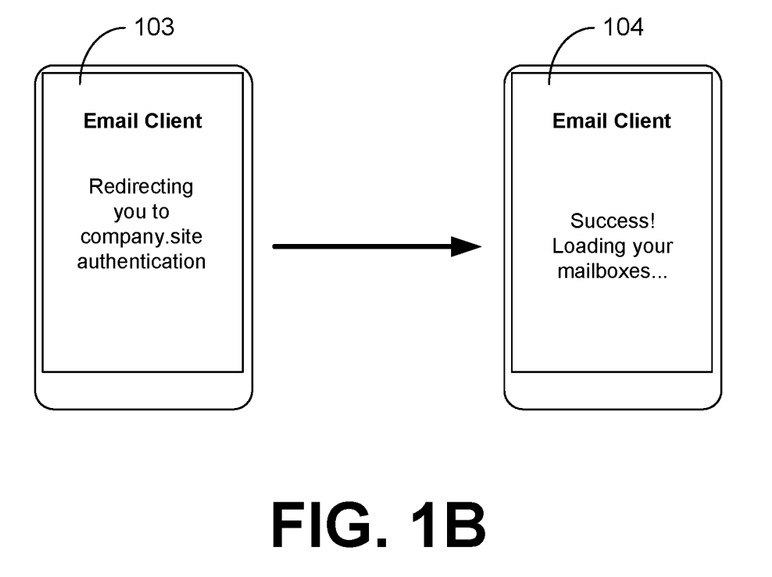

Accordingly, as will be described herein, the email client submits an identity assertion request to the specified identity provider. In response to the identity assertion request, the identity provider can authenticate the user as well as the device on which the email client is installed before providing an identity assertion to the email client. At 104, the email client has provided an identity assertion from the identity provider to the email service, which can verify the identity assertion and provide access to the user's email assuming the assertion can be validated. In some cases, the email service might also provide a separate session token to the email client that can be used to validate the email client's subsequent communications with the email service.

Figure 1C:
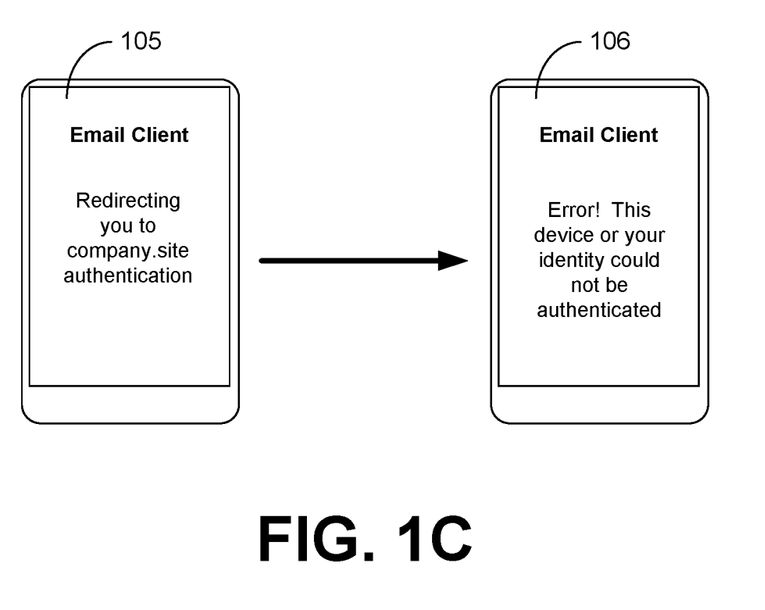

As an alternative example to FIG. 1B, reference is now made to FIG. 1C. In FIG. 1C, at 105, the email client can indicate that the email service is redirecting the email client to an identity provider so that the email service can obtain an identity assertion from the identity provider. However, at 106, the identity provider has indicated that the user's identity or device was not authenticated.

Figure 2:
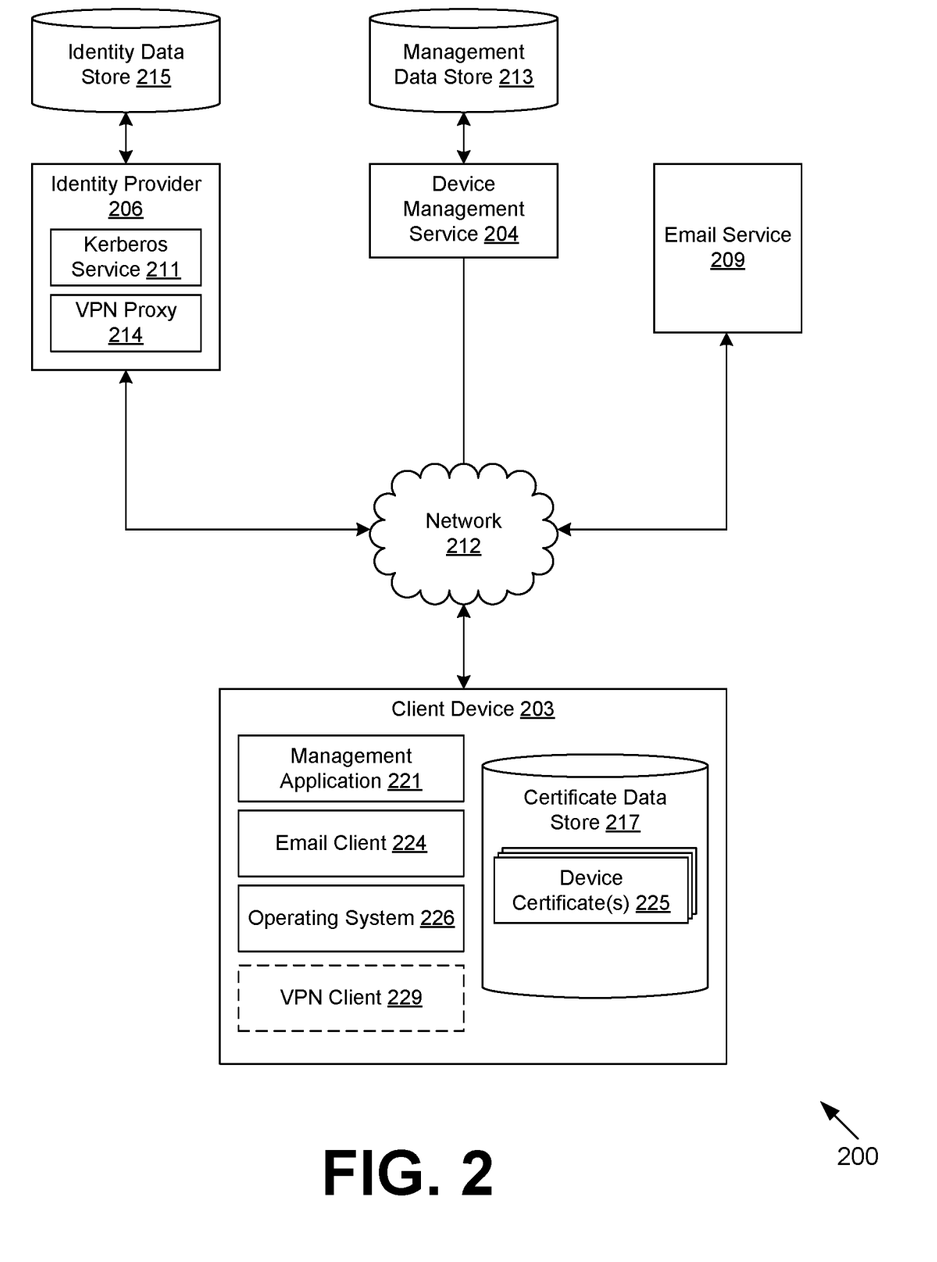
FIG. 2 is a drawing of a networked environment according to various examples of the disclosure.

With reference to FIG. 2, shown is a networked environment 200 according to various examples. The networked environment 200 includes a client device 203, a device management service 204, an identity provider 206, and an email service 209 which can be in data communication with one another over the network 212. The network 212 includes, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

The device management service 204, the identity provider 206, and the email service 209 can include, for example, a server computer or any other system providing computing capabilities. Alternatively, the device management service 204, the identity provider 206, and the email service 209 can employ multiple computing devices that can be arranged, for example, in one or more server banks, computer banks, or other arrangements. The computing devices can be located in a single installation or can be distributed among many different geographical locations. For example, the device management service 204, the identity provider 206, and the email service 209 can include multiple computing devices that together form a hosted computing resource, a grid computing resource, or any other distributed computing arrangement. In some cases, the device management service 204, the identity provider 206, and the email service 209 can operate as at least a portion of an elastic computing resource where the allotted capacity of processing, network, storage, or other computing-related resources can vary over time. The device management service 204, the identity provider 206 and the email service 209 can also include or be operated as one or more virtualized computer instances. Generally, the device management service 204, the identity provider 206 and the email service 209 can be operated in accordance with particular security protocols such that they are considered trusted computing environments.

The device management service 204 can manage or oversee the operation of multiple client devices 203. In some examples, an enterprise, such as one or more companies or other organizations, can operate the device management service 204 to oversee or manage the operation of the client devices 203 of employees, contractors, or other users within an enterprise environment. In this sense, the client devices 203 can include managed devices that are managed by the device management service 204.

To facilitate management of client devices 203, the device management service 204 can establish a secure communications channel with the client devices 203 (e.g., a mobile device management channel, or MDM channel). The device management service 204 can establish the secure communications channel by creating a secure communication link with the client device 203. A secure communication link can be established using MDM application programming interfaces (APIs) that are provided by an operating system executed by the client device 203. In some examples, the secure communications channel can be established using a push notifications framework or notification service provided by an operating system ecosystem associated with the client device 203 that allows for communications between the device management service 204 and a client device 203 over the network 212 that are encrypted using a digital certificate.

The client device 203 can be enrolled as a managed device with the device management service 204 through APIs provided by the operating system. The enrollment process can include authentication of a user's credentials. Upon authentication of a user's credentials by the device management service 204, the client device 203, using the MDM APIs of the operating system, can enroll the client device 203 as a managed device so that various management functions can be securely performed over the secure communications channel.

Examples of management functions can include commands to erase certain data from the client device 203, commands to install certain applications or application updates, commands to lock a client device 203 or activate a display lock feature, a command to remotely perform a factory reset of the client device 203, or other management functions. Additionally, data can be securely transmitted through the secure communications channel to the client device 203 or applications executed by the client device 203.

Additionally, the operating system of the client device 203 can also provide the ability to create access-restricted storage that is associated with particular applications installed on the client device 203. Access-restricted storage can be associated with multiple applications that are installed on the client device 203 through the secure communications channel. In some scenarios, applications that are signed by a common certificate can be provided access to the access-restricted storage of each other, whereas applications that are not signed by the certificate do not have access to the access-restricted storage of other applications. Additionally, the device management service 204 can transmit data to the client device 203 over the secure communications channel that can be stored in the access-restricted storage such that it is accessible by certain applications and inaccessible to other applications that are installed on the client device 203.

The secure communications channel can be encrypted or secured using a digital certificate that is associated with the client device 203, the device management service 204, or an enterprise with which the client device 203 is associated. In one scenario, the device management service 204 can obtain a security certificate, such as a secure sockets layer (SSL) certificate, that is unique to a particular enterprise with which a client device 203 is associated. In one example, an administrator associated with the enterprise can provide a certificate to the device management service 204 using an administrator console or other functionality with which a certificate can be uploaded. The certificate can also be signed by a certificate authority, which can in some cases be operated by the device management service 204. The device management service 204 can encrypt or secure the secure communications channel using the certificate so that the secure communications channel is a secure communication link over the network 212 through which data can be sent to the client device 203.

Additionally, the device management service 204 can specify that data sent through the secure communications channel can only be accessed by certain applications installed on the client device 203. The applications that can access data sent through the secure communications channel can also be restricted in how certain data can be manipulated, viewed or handled on the client device 203. For example, an application installed on the client device 203 can be coded to restrict the ability of a user to capture, share, or otherwise remove data from the client device 203 that is received through the secure communications channel.

The device management service 204 can also facilitate ensuring that client devices 203 that are administered by the device management service 204 are operating in compliance with various compliance rules. In one scenario, the device management service 204 can issue management commands that instruct a client device 203 to take a particular action with respect to a compliance rule. For example, if a client device 203 is designated as lost or stolen, the device management service 204 can issue a command instructing the client device 203 to erase data and applications that were previously sent to the client device 203 through the secure communications channel or other communication links and otherwise stored on the client device 203. The device management service 204 can also obtain data from a third party computing environment, such as an application, a security code, authentication token, or other data. As another example, if the device management service 204 determines that a client device 203 has violated a compliance rule with respect to having unauthorized modifications or unauthorized applications installed on the client device 203, the device management service 204 can issue a command instructing the client device 203 to erase data and applications stored on the client device 203. As a further example, the device management service 204 can also issue a command instructing the client device 203 to activate a display lock of the client device 203 that requires a user to enter a personal identification number (PIN) in order to use the client device 203.

To issue a command to a client device 203, the identity provider 206 can establish a command queue for a particular client device 203. The management application 221 installed on the client device 203 can periodically retrieve commands from the command queue and execute them on the client device 203. In other implementations, commands can be pushed to a client device 203 through an operating system API that provides devices management capability to device management service 204.

The data stored in the management data store 213 and available to the device management service 204 includes, for example, authentication data, compliance rules, device data, and potentially other data. The authentication data can include data used to verify one or more security credentials presented by a user for authentication. To this end, secure certificates can be stored and then be made available to the client device 203 that has been authenticated in order to encrypt the secure communications channel and/or for other functions.

Within the context of an enterprise, compliance rules include one or more rules that, when violated, can cause the device management service 204 to issue a management command. Compliance rules can include a list of unauthorized hardware functions, software functions, or applications that potentially pose a threat to enterprise data or to the use of enterprise applications. As noted above, if client device 203 falls out of compliance with one or more compliance rules, a management command can be transmitted to the client device 203 instructing the client device 203 to perform one or more actions specified by the compliance rule. Alternatively, a compliance rule can also reside on the client device 203, which can self-enforce compliance rules. The management data store 213 can also include user account data. User account data can include information with which a user account can be authenticated, such as user credentials. User account data can also include data such as email, contact, calendar data, documents, files or other data that is associated with a user account.

Device data can represent data stored in the management data store 213 that is associated with client devices 203 that are enrolled with the device management service 204 as managed devices. Device data can include a unique device identifier associated with the client device 203, device policies that are associated with a particular client device 203, status information associated with a particular client device 203, and other data that facilitates management of the client device 203 by the device management service 204. Device data can also include user data that is synchronized with a particular client device 203. A user account can be associated with multiple client devices 203. Different client devices 203 associated with a user account can have different user account data stored thereon. For example, a user's smartphone can have a certain number of documents or email messages stored on the device, whereas the user's laptop or tablet can have varying amounts of types of user account data stored on the device.

The identity provider 206 can provide a federated identity service on behalf of the email service 209. To this end, the identity provider 206 can be in communication with an identity data store 215 that stores information associated with user identities. This information can include, for example, usernames, security credentials, biometric identity information, authorized client applications, unauthorized client applications, authorized client devices 203, unauthorized client devices 203, device certificate or certificate signatures that correspond to authorized or unauthorized client devices 203, and so on. As will be described, users are able to authenticate by way of the identity provider 206 in order to access services provided by the multiple service providers 209.

The identity provider 206 can include a plurality of platform adapters to facilitate platform-specific authentication on different client platforms, such as IOS, ANDROID, WINDOWS, and so on. In one implementation, the identity provider 206 can include a Kerberos service 211 and a VPN proxy 214. The Kerberos service 211 can negotiate Kerberos authentication with a client device 203 that is based upon a username/password combination of a user and/or a device certificate, or a device-specific credential, that is issued to the client device 203 when the client device is enrolled as a managed device with the device management service 204. In certain operating systems executed by client devices 203, such as IOS, the operating system intercepts a Kerberos challenge to perform user authentication on behalf of an application to which the challenge was sent.

The identity provider 206 can also execute a VPN proxy 214. The VPN proxy 214 can be used to receive network traffic sent through a VPN tunnel from a VPN client on a client device 203. Because a VPN tunnel is typically secured or encrypted with a device certificate, the identity provider 206 can identify a certificate signature of the certificate and identify a particular mobile device from which network traffic is sent through a VPN tunnel. The VPN proxy 214 can be employed by the identity provider 206 to authenticate client devices 203 running an operating system that does not have a built-in Kerberos implementation, such as ANDROID.

The email service 209 can represent a hosted or third party email service that can be utilized to provider email and/or calendar services for users of the enterprise. The email service 209 can represent one or more servers that and provide email capabilities. In one example, the email service 209 can represent a hosted MICROSOFT EXCHANGE service such as OFFICE 365. As noted above, the email service 209 can be configured so that authentication of users in a particular enterprise or domain is federated to the identity provider 206.

The email service 209 and the identity provider 206 can communicate with the client device 203 over the network 212 by way of hypertext transfer protocol (HTTP), simple object access protocol (SOAP), representational state transfer (REST), and/or other protocols.

The device management service 204 and identity provider 206 can be configured to enable single sign-on capability for an email client by adding an application identifier or a bundle identifier for the email client to configuration data stored in the management data store 213. The application identifier or bundle identifier of the email client can also be associated with a single sign-on capability in the identity data store 215 as well. Accordingly, if an identity assertion request is received by the identity provider 206 from a client device 203, and the request is received from an application matching the bundle identifier of the email client, the identity provider 206 can then attempt to authenticate the user and/or the device from which the request was received.

The client device 203 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 203 can include a display that includes, for example, one or more devices such as liquid crystal display (LCD) displays or other types of display devices. The client device 203 can also be equipped with networking capability or networking interfaces, including a localized networking or communication capability such as an NFC capability, RFID read and/or write capability, a microphone and/or speaker, or other localized communication capability.

The client device 203 can execute various applications, such as a management application 221 and an email client 224, such as OUTLOOK MOBILE or other email clients that can be used to access email services through an email service 209. The management application 221 can receive security credentials from a user, such as a username and password, to authenticate with the device management service 204. Upon authentication with the device management service 204, the management application 221 can obtain a device certificate 225 that is stored in a certificate data store 217. The device certificate 225 represents a device-specific credential that is generated by or on behalf of the device management service 204. The device certificate 225, or a signature thereof, can be unique to the client device 203. The device certificate 225 can represent a certificate that is employed in a Kerberos authentication process or one that is used to encrypt SSL VPN communications between the client device 203 and the VPN proxy 214.

The operating system 226 of the client device 203 can facilitate certificate management as well as device management of the client device 203. The operating system 226, in some examples, can intercept Kerberos authentication challenges or requests and negotiate Kerberos authentication on behalf of an application installed on the client device 203. Examples of this disclosure, in some examples, can leverage this feature of certain operating systems 226 to provide single sign-on capabilities that also authenticate the client device 203 as an authorized device from which the email client 224 can access the email service 209.

Although described as an application, it is understood that the management application 221 can be an integral component of an operating system 226 of the client device 203. Also, in some scenarios, the device certificate 225 can be provisioned directly to the operating system for all applications to use. This can be performed under iOS using either a certificate profile that is installed in a managed certificate keychain or a combination of a certificate and a Kerberos profile together. In the latter scenario, the device certificate 225 can be employed by the operating system 226 to facilitate Kerberos authentication with the Kerberos service 211 for applications that are identified in the certificate profile. The applications can be identified by their application identifier or a bundle identifier. Rather than being stored in the management application 221, the device certificate 225 can be stored in a certificate data store 217 that is managed by the operating system 226 in these scenarios.

In other implementations, such as in the ANDROID scenario, the device certificate 225 can represent a certificate that is installed along with a VPN client 229. The VPN client 229 can be provisioned on the client device 203 by the device management service 204. The device management service 204 can also push one or more per-app VPN profiles to the client device 203 that instruct the operating system 226 to route network traffic from the email client 224 through a VPN tunnel created by the VPN client 229 with the VPN proxy 214. The network traffic from the email client 224 that is sent through this VPN tunnel can be secured using the device certificate 225 that is installed along with the VPN client 229 or a per-app VPN profile corresponding to the email client 224. The VPN proxy 214 can extract a certificate signature corresponding to the device certificate 225, which can in turn be utilized to authenticate the client device 203 with the identity provider 206.

Accordingly, to authenticate a user along with a client device 203 on which the email client 224 is installed, the email client 224 can request an identity assertion from the identity provider 206. An identity assertion in security assertion markup language (SAML), for example, contains a packet of security information that service providers 209 use to make access control decisions. SAML supports three types of statements: authentication statements, attribute statements, and authorization decision statements. Authentication statements assert to the email service 209 that the client device 203 authenticated with the identity provider 206 at a particular time using a particular method of authentication. An attribute statement asserts that a client device 203 is associated with certain attributes. An authorization decision statement asserts that the email client 224 is permitted to perform a certain action relative to a resource offered by the email service 209. Extensible access control markup language (XACML) and/or other languages can be employed.

Figure 3:
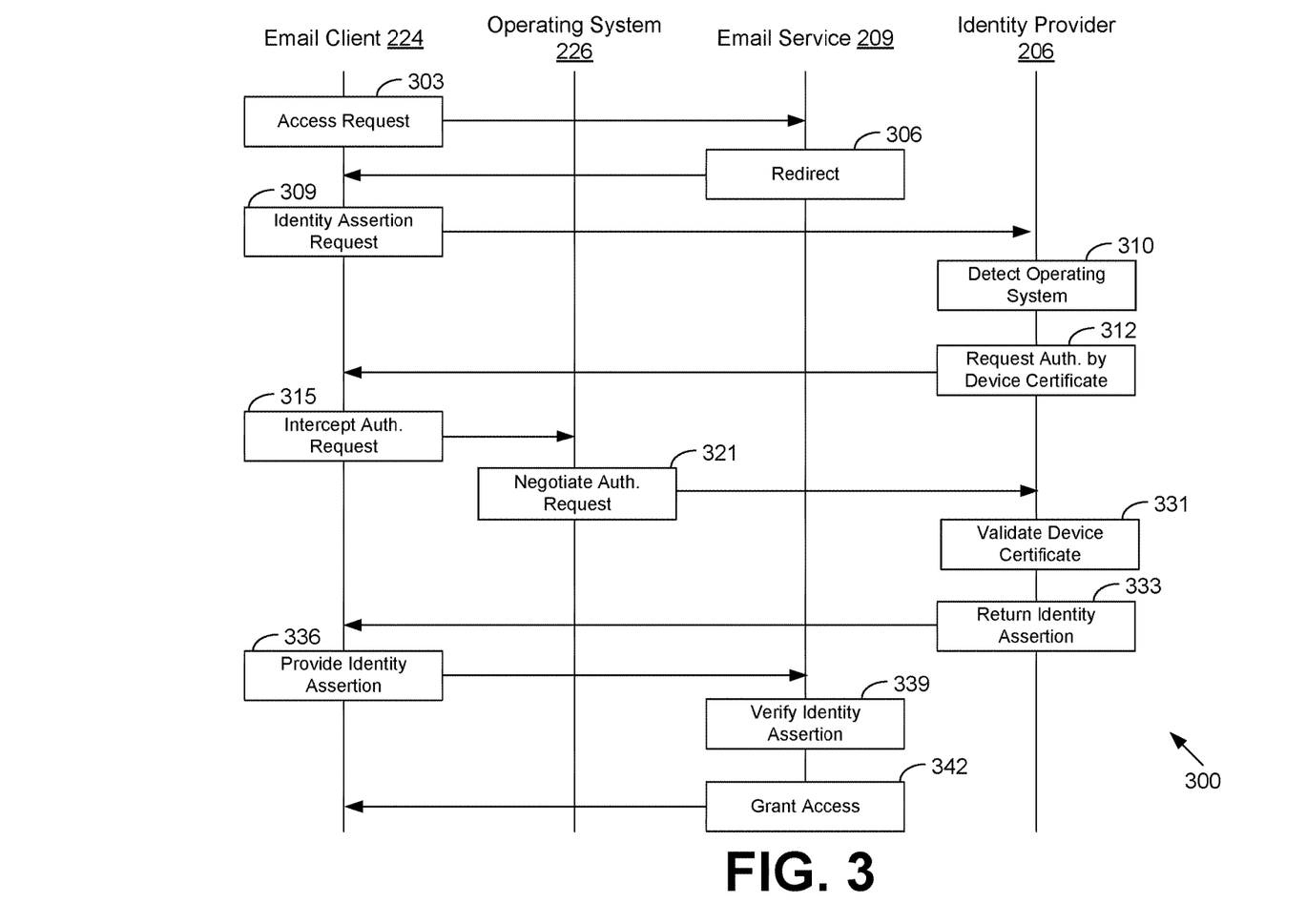
FIGS. 3-4 depict a sequence diagram illustrating an example component interaction according to various examples of the present disclosure.

Turning now to FIG. 3, shown is a sequence diagram 300 illustrating one example of interaction between the email client 224, the operating system 226, the email client 224, and the identity provider 206. Functionality attributed to the operating system 226, email client 224, email service 209, and the identity provider 206 can be implemented in a single process or application or in multiple processes or applications. The separation or segmentation of functionality as discussed herein is presented for illustrative purposes only.

Beginning with step 303, the email client 224 sends an access request to the email service 209. In some examples, the email client 224 can generate a discovery request prior to the access request. A discovery request can be generated when the user launches the email prior to authentication with the email service 209 or when the user adds a new account within the email client 224. The discovery request is generated when the user enters a user identifier for his or her email account, such as an email address, and submits the user identifier within the email client 224. The discovery request can be sent to the email service 209 and also request information regarding a server address of one or more mail server to which an access request should be sent. The access request can include a user identifier identifying the user's account within the email service 209.

At step 306, the email service 209 sends a redirection back to the email client 224 that causes email client 224 to redirect the access request to the identity provider 206. The redirection can be sent in the form of a SAML redirection that identifies an address of the identity provider 206 as the system to which authentication is delegated by the email service 209. The SAML redirection can indicate to the email client 224 that an identity assertion should be obtained from the identity provider 206 to access the user's email through the email service 209.

At step 309, the email client 224 can send an identity assertion request to the identity provider 206. The identity assertion request can be a SAML request sent to a server process of the identity provider 206 that listens for SAML request. The SAML request can include data that identifies the user associated with the client device 203 and the email service 209 for which the identity assertion is sought.

At step 310, the identity provider 206 detects the operating system 226 executed by the client device 203 and responds at step 312 by requesting authentication by way of a device certificate for the specific platform. The operating system can be embedded within or detected from the identity assertion request.

At step 312, the identity provider can send a request to authenticate the client device 203 according to the operating system or platform detected at step 310. For example, in the case of IOS, the identity provider 206 can request authentication by way of a Kerberos authentication process. This request can correspond to a certificate challenge or a Kerberos challenge. The request or challenge can also identify the application identifier of the email client 224.

At step 315, the operating system 226 can intercept the authentication challenge or request received at step 312. In one example, the operating system 226 can intercept the authentication challenge if the application identifier specified by a Kerberos profile installed by the device management service 204 identifies the email client 224 as an application for which the operating system should perform Kerberos authentication, such as in the case of an IOS deployment according to examples of this disclosure.

At step 321, the operating system 226 can negotiate Kerberos authentication on behalf of the email client 224 with the identity provider 206. The operating system 226 can communicate with the Kerberos service 211 of the identity provider 206 to negotiate Kerberos authentication based upon the device certificate 225 and/or authentication credentials for which the user can be prompted. If the user has previously provided his or her authentication credentials, the operating system 226 can authenticate the user with the identity provider 206 based upon this previous authentication. To negotiate the authentication request, the operating system 226 can, in some examples, communicate with a Kerberos ticket granting service or other systems, servers, or processes associated with Kerberos authentication as implemented by the identity provider 206.

Because the Kerberos authentication can be performed based upon a device certificate 225 installed by the device management service 204 on the client device 203, the identity provider 206 can validate the device certificate 225 at step 331. In some cases, a device identifier that identifies the device is embedded within or derived from the device certificate 225. In one example, the identity provider 206 can communicate with the device management service 204 to determine whether the client device 203 is authorized to access email through the email service 209. This determination can be made by the device management service 204 or the identity provider 206 based upon whether the client device 203 is enrolled as a managed device with the device management service 204 or whether the client device 203 or user is in compliance with one or more compliance rules.

At step 333, assuming the device certificate 225 is validated and a determination has been made that the client device 203 on which the email client 224 is installed is authorized to access email through the email service 209, an identity assertion can be provided to the email client 224. The identity assertion can represent a SAML assertion that can be provided to the email service 209 to authenticate the email client 224 and the user account associated with the user identifier provided to the email service 209 in the access request in step 303.

At step 336, the email client 224 provides the identity assertion to the email service 209. In one example, the SAML assertion that was obtained from the identity provider 206 can be presented to the email service 209. At step 339, the email service 209 verifies the identity assertion. At step 342, the email service 209 can grant access to the user's email at step 342.

Figure 4:
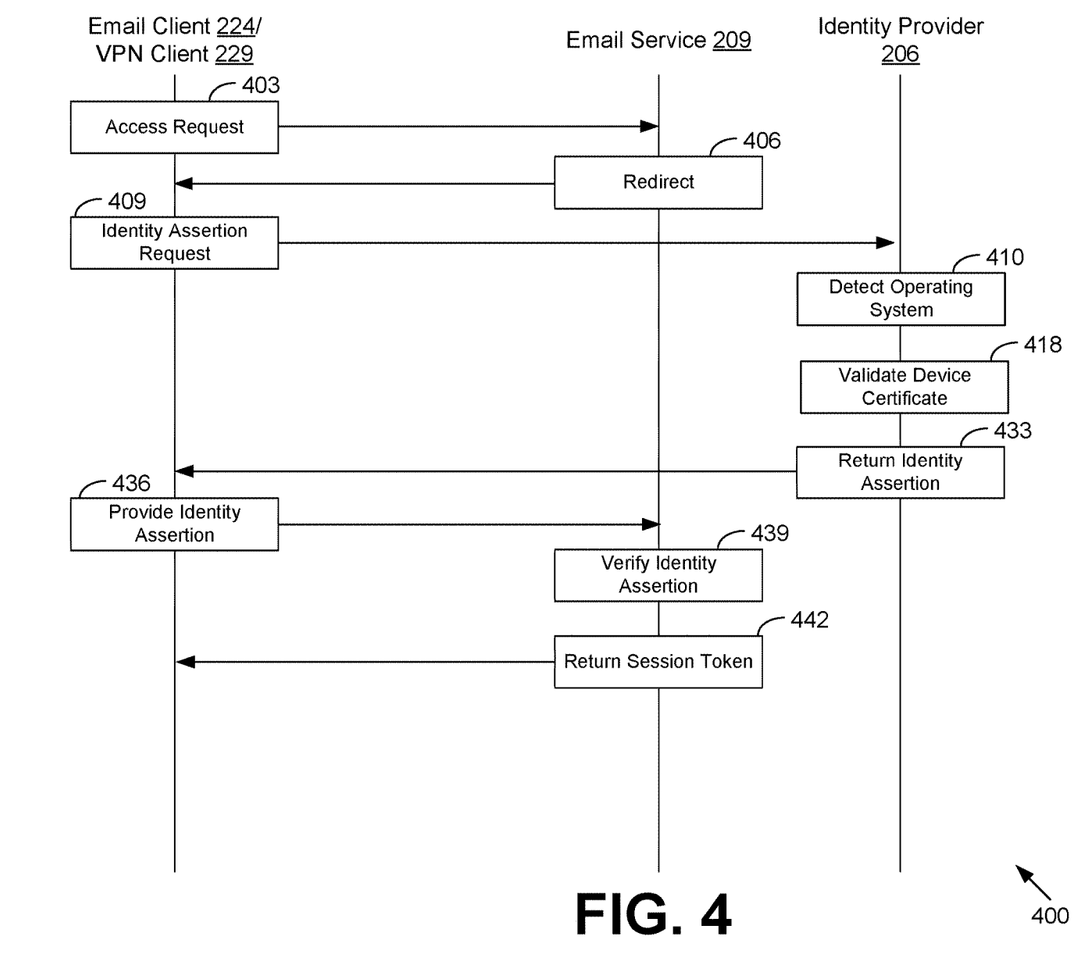

Turning now to FIG. 4, shown is a sequence diagram 300 illustrating one example of interaction between the email client 224, the VPN client 229, the email client 224, and the identity provider 206. Functionality attributed to the VPN client 229, email client 224, email service 209, and the identity provider 206 can be implemented in a single process or application or in multiple processes or applications. The separation or segmentation of functionality as discussed herein is presented for illustrative purposes only.

As noted above, in certain implementations, such as in the case of an ANDROID operating system, the device management service 204 can install a VPN client 229 along with one or more per-app VPN profiles on the client device 203 that causes the operating system 226 to route network traffic from the email client 224 through the VPN client 229. The per-app VPN profile, in some examples, can cause only network traffic destined for certain network addresses, such as a network address corresponding to the identity provider 206, to be routed through a VPN tunnel established by the VPN client 229 to the identity provider 206. In this scenario, network traffic destined for the email service 209 can routed by the email client 224 to the email service 209 outside of the VPN tunnel to the identity provider 206. The identity provider 206 can utilize the device certificate 225 installed by the device management service 204 in a VPN profile or with the VPN client 229 to secure network traffic to the identity provider 206. The identity provider 206 can in turn authenticate the client device 203 based upon a certificate signature or other characteristics of network traffic from the VPN client 229 or of the VPN tunnel.

Beginning with step 403, the email client 224 sends an access request to the email service 209. The access request can be sent outside of the VPN tunnel. In some examples, the email client 224 can generate a discovery request prior to the access request. A discovery request can be generated when the user launches the email prior to authentication with the email service 209 or when the user adds a new account within the email client 224. The discovery request is generated when the user enters a user identifier for his or her email account, such as an email address, and submits the user identifier within the email client 224. The discovery request can be sent to the email service 209 and also request information regarding a server address of one or more mail server to which an access request should be sent. The access request can include a user identifier identifying the user's account within the email service 209.

At step 406, the email service 209 sends a redirection back to the email client 224 that causes email client 224 to redirect the access request to the identity provider 206. The redirection can be sent in the form of a SAML redirection that identifies an address of the identity provider 206 as the system to which authentication is delegated by the email service 209. The SAML redirection can indicate to the email client 224 that an identity assertion should be obtained from the identity provider 206 to access the user's email through the email service 209.

At step 409, the email client 224 can send an identity assertion request to the identity provider 206. The identity assertion request can be sent through the VPN tunnel by the VPN client 229. The identity assertion request can be a SAML request sent to a server process of the identity provider 206 that listens for SAML request. The SAML request can include data that identifies the user associated with the client device 203 and the email service 209 for which the identity assertion is sought.

At step 410, the identity provider 206 detects the operating system 226 executed by the client device 203 and responds at step 312 by requesting authentication by way of a device certificate for the specific platform. The operating system can be embedded within or detected from the identity assertion request. In some examples, the operating system can be detected based upon data embedded in the VPN tunnel established by the VPN client 229 with the identity provider 206.

At step 418, the identity provider 206 can validate the device certificate 225. The identity provider 206 can generate a certificate signature or other artifacts from the VPN tunnel established by the VPN client 229 or the device certificate 225 employed by the VPN client 229. In some cases, a device identifier that identifies the device is embedded within or derived from the device certificate 225. In one example, the identity provider 206 can communicate with the device management service 204 to obtain a copy of the device certificate 225 issued to the client device 203 or a signature of the device certificate 225. In this way, the identity provider 206 can validate not only the credentials of the user but also the client device 203 on which the email client 224 is installed.

In one example, the identity provider 206 can also validate the client device 203 based on other factors. For example, the device can be validated by the device management service 204 or the identity provider 206 based upon whether the client device 203 is enrolled as a managed device with the device management service 204 or whether the client device 203 or user is in compliance with one or more compliance rules.

At step 433, assuming the device certificate 225 is validated and a determination has been made that the client device 203 on which the email client 224 is installed is authorized to access email through the email service 209, an identity assertion can be provided to the email client 224. The identity assertion can be provided through the VPN tunnel established by the VPN client 229. The identity assertion can represent a SAML assertion that can be provided to the email service 209 to authenticate the email client 224 and the user account associated with the user identifier provided to the email service 209 in the access request in step 303.

At step 436, the email client 224 provides the identity assertion to the email service 209. In one example, the SAML assertion that was obtained from the identity provider 206 can be presented to the email service 209. At step 439, the email service 209 verifies the identity assertion. At step 442, the email service 209 can grant access to the user's email at step 342.

Figure 5:
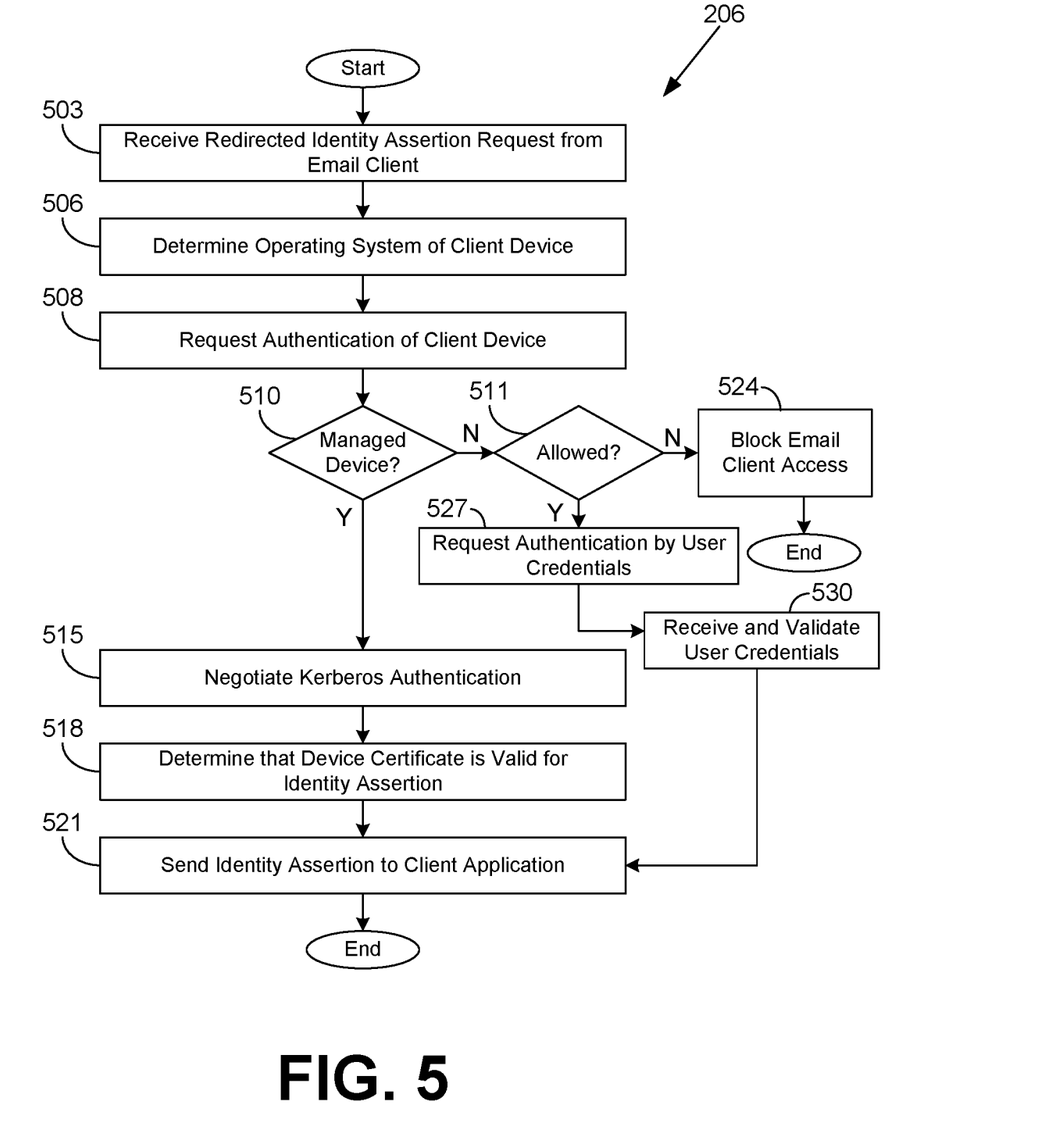
FIGS. 5-6 are flowcharts illustrating examples of functionality according to various examples of the present disclosure.

Moving on to FIG. 5, shown is a flowchart that provides one example of the operation of an identity provider 206. As an alternative, the flowchart of FIG. 5 can be viewed as depicting an example of elements of a method implemented in a computing device. Functionality attributed to the identity provider 206 can be implemented in a single process or application or in multiple processes or applications. The separation or segmentation of functionality as discussed herein is presented for illustrative purposes only.

Beginning with step 503, the identity provider 206 receives an identity assertion request from an email client 224. The email client 224 has been redirected to the identity provider 206 by an email service 209. The redirection can be performed, for example, by way of a hypertext transfer protocol (HTTP) redirection response having status code 302. At step 506, the identity provider 206 can determine an operating system of the client device 203. The identity provider 206 can determine the platform also by examining the user-agent string of the HTTP request. For example, the identity provider 206 can determine that the client device 203 corresponds to IOS, ANDROID, WINDOWS, BLACK-BERRY, or other platforms based at least in part on corresponding identifiers contained in the user-agent string. In the case of IOS, in some examples, the identity provider can proceed to perform Kerberos authentication of the client device 203.

At step 508, the identity provider 206 requests authentication of the client device based at least in part on the detected operating system of the client device 203. Specifically, the identity provider 206 can request authentication using a device-specific credential using a particular authentication protocol. For example, authentication can be performed using Kerberos authentication as specified by a Kerberos authentication profile installed on the client device 203 by the device management service 204. The authentication can be performed using the device certificate 225 identified by a Kerberos profile. When the operating system is ANDROID, authentication can be performed using a different mechanism based upon a VPN tunnel as noted above. The request for authentication can be performed by returning an HTTP response having status code 401 or a Kerberos challenge, indicating that authorization is required. Further, the HTTP response can specifically request authentication by a particular protocol, such as the Kerberos protocol, through the use of the device certificate 225.

At step 510, the identity provider 206 determines whether the client device 203 corresponds to a managed device. If the client device 203 is a managed device, the authentication of step 508 would complete properly. If the authentication of step 508 fails, the client device 203 can be presumed to be unmanaged. If the client device 203 does not correspond to a managed device, the identity provider 206 continues to step 511. If the client device 203 does correspond to a managed device, the identity provider 206 moves to step 515.

At step 515, the identity provider 206 can negotiate Kerberos authentication with the client device 203. As noted above, Kerberos authentication, in the case of IOS, can be performed by the operating system 226 because the operating system 226 can intercept and handle the HTTP response status code 401 and handle authentication on behalf of the email client 224.

At step 518, the identity provider 206 determines that the presented device certificate 225 is valid for the requested identity assertion. In some examples, the identity provider 206 can communicate with the device management service 204 to validate the device certificate 225. In other examples, the identity provider 206 can maintain data regarding client devices 203 that are approved to access the email service 209 using the email client 224.

At step 521, if the device certificate 225 and the corresponding client device 203 can be validated, the identity assertion is generated and sent to the email client 224. The identity assertion can include security assertion markup language (SAML), extensible access control markup language (XACML), or other data. Thereafter, the process proceeds to completion.

If, instead, the client device 203 is not a managed device at step 510, at step 511, the identity provider 206 determines whether the email client 224 is permitted to execute on an unmanaged device according to a policy specified by the device management service 204 or an IT administrator. If the email client 224 is not permitted to execute on an unmanaged device, the identity provider 206 moves from step 511 to step 524 and blocks the authentication of the email client 224 and an unauthorized message may be returned. Thereafter, the process proceeds to completion.

If the email client 224 is permitted to execute on an unmanaged device, the identity provider 206 moves from step 511 to step 527, and the identity provider 206 requests authentication by user-supplied credentials, such as a username and password, biometric credentials, multi-factor credentials, and so on. At step 530, the identity provider 206 receives and validates the user-supplied credentials from the email client 224. The identity provider then moves to step 521, where the identity assertion is generated and sent to the email client 224. The identity assertion can include security assertion markup language (SAML), extensible access control markup language (XACML), or other data. Thereafter, the process proceeds to completion.

Figure 6:
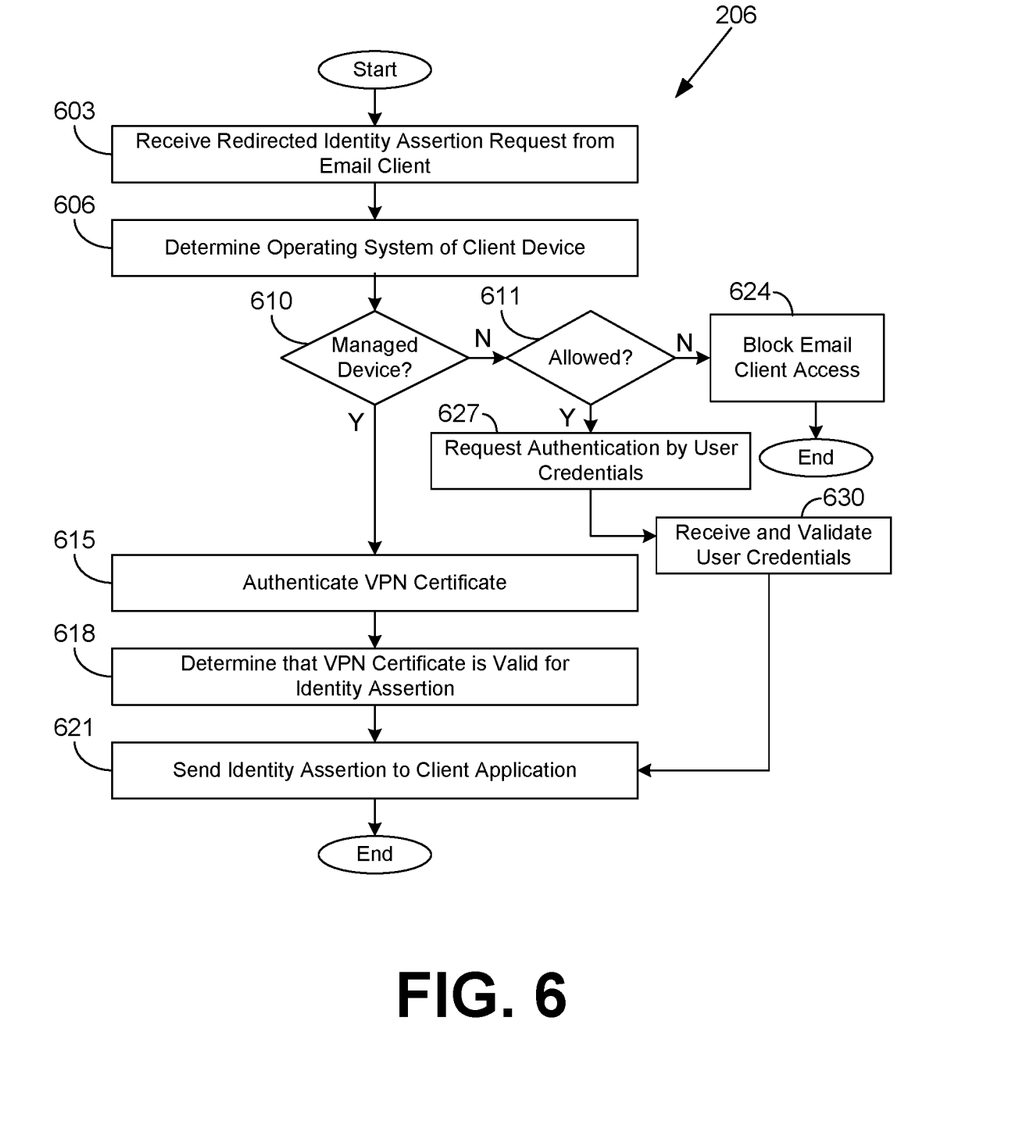

Moving on to FIG. 6, shown is a flowchart that provides one example of the operation of an identity provider 206. As an alternative, the flowchart of FIG. 6 can be viewed as depicting an example of elements of a method implemented in a computing device. Functionality attributed to the identity provider 206 can be implemented in a single process or application or in multiple processes or applications. The separation or segmentation of functionality as discussed herein is presented for illustrative purposes only.

Beginning with step 603, the identity provider 206 receives an identity assertion request from an email client 224. The email client 224 has been redirected to the identity provider 206 by a email service 209. The redirection can be performed, for example, by way of a hypertext transfer protocol (HTTP) redirection response having status code 302.

At step 606, the identity provider 206 can determine an operating system of the client device 203. The identity provider 206 can determine the platform also by examining the user-agent string of the HTTP request. For example, the identity provider 206 can determine that the client device 203 corresponds to IOS, ANDROID, WINDOWS, BLACK-BERRY, or other platforms based at least in part on corresponding identifiers contained in the user-agent string. In the case of ANDROID, in some examples, the identity assertion can be received by a VPN proxy 214 of the identity provider 206 through a VPN tunnel established by the VPN client 229. When the operating system is ANDROID, authentication can be performed based upon properties of the VPN tunnel or a device certificate 225 used to secure the VPN tunnel.

At step 610, the identity provider 206 determines whether the client device 203 corresponding to the device certificate 225 used to secure the VPN tunnel corresponds to a managed device. If the client device 203 is a managed device, the authentication of step 508 would complete properly. If the authentication of step 608 fails, the client device 203 can be presumed to be unmanaged. If the client device 203 does not correspond to a managed device, the identity provider 206 continues to step 611. If the client device 203 does correspond to a managed device, the identity provider 206 moves to step 615.

At step 615, the identity provider 206 can authenticate or validate the device certificate 225 used to secure the VPN tunnel. As noted above, a certificate signature can be computed from properties of the VPN tunnel and compared to a signature provided by the device management service 204 or otherwise accessible to the identity provider 206.

At step 618, the identity provider 206 can determine that the presented device certificate 225 or calculated certificate signature is valid for the requested identity assertion. In some examples, the identity provider 206 can communicate with the device management service 204 to validate the device certificate 225. In other examples, the identity provider 206 can maintain data regarding client devices 203 that are approved to access the email service 209 using the email client 224.

At step 621, if the device certificate 225 and the corresponding client device 203 can be validated, the identity assertion is generated and sent to the email client 224. The identity assertion can include security assertion markup language (SAML), extensible access control markup language (XACML), or other data. Thereafter, the process proceeds to completion.

If, instead, the client device 203 is not a managed device at step 610, at step 611, the identity provider 206 determines whether the email client 224 is permitted to execute on an unmanaged device according to a policy specified by the device management service 204 or an IT administrator. If the email client 224 is not permitted to execute on an unmanaged device, the identity provider 206 moves from step 611 to step 624 and blocks the authentication of the email client 224 and an unauthorized message may be returned. Thereafter, the process proceeds to completion.

If the email client 224 is permitted to execute on an unmanaged device, the identity provider 206 moves from step 611 to step 527, and the identity provider 206 requests authentication by user-supplied credentials, such as a username and password, biometric credentials, multi-factor credentials, and so on. At step 630, the identity provider 206 receives and validates the user-supplied credentials from the email client 224. The identity provider then moves to step 621, where the identity assertion is generated and sent to the email client 224. The identity assertion can include security assertion markup language (SAML), extensible access control markup language (XACML), or other data. Thereafter, the process proceeds to completion.

The flowcharts of FIGS. 5-6 and the sequence diagrams of FIG. 3-4 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 203, the device management service 204, the identity provider 206, the email service 209, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the device management service 204, the identity provider 206, the service providers 209, the management application 221, the email client 224, and/or other components can be stored in one or more storage devices and be executable by one or more processors. Also, a data store, such as the identity data store 215 or the management data store 213 can be stored in the one or more storage devices.

The identity provider 206, the device management service 204, the email client 224, the management application 221, the email client 224, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying a program executable in at least one computing device, the program, when executed by the at least one computing device, causing the at least one computing device to at least: receive a request for an identity assertion from an email client, the request being generated in response to a redirection received in the email client from an authentication server; in response to determining that a mobile device executing the email client is unauthenticated, send to the mobile device a response to the request indicating that the mobile device is unauthorized to access the email service; identify a device certificate signature associated with the mobile device, the device certificate signature generated from a device certificate used to secure network traffic between the mobile device and at least one computing device, wherein the certificate is provided to the client device upon enrollment of the client device with a device management service; determine that the device certificate is unexpired and unrevoked; determine that the mobile device is authorized to access the email service of the user based upon the device certificate signature; and in response to determining that the device certificate signature is unexpired and unrevoked and that the mobile device is authorized to access the email service, send the identity assertion to the email client.

2. The non-transitory computer-readable medium of claim 1, wherein the response indicating that the mobile device is unauthorized to access the email service of the user comprises a security assertion markup language (SAML) redirection.

3. The non-transitory computer-readable medium of claim 1, wherein an operating system of the mobile device is Android.

4. The non-transitory computer-readable medium of claim 1, wherein the device certificate installed on the mobile device by a management service upon enrollment of the mobile device with the management service as a managed device.

5. The non-transitory computer-readable medium of claim 4, wherein the device certificate is installed as a portion of a single sign-on profile installed by the management service on the mobile device.

6. The non-transitory computer-readable medium of claim 4, wherein the device certificate is associated with a virtual private network (VPN) client installed on the mobile device.

7. The non-transitory computer-readable medium of claim 4, wherein the program causes the at least one computing device to determine that the mobile device is authorized to access the email service of the user by determining that the mobile device complies with at least one compliance rule or whether the mobile device is enrolled as a managed device with a management service.

8. A system, comprising: at least one computing device; and an identity provider service executable by the at least one computing device, the identity provider service configured to cause the at least one computing device to at least: receive a request for an identity assertion from an email client, the request being generated in response to a redirection received in the email client from an authentication server; in response to determining that a mobile device executing the email client is unauthenticated, send to the mobile device a response to the request indicating that the mobile device is unauthorized to access the email service; identify a device certificate signature associated with the mobile device, the device certificate signature generated from a device certificate used to secure network traffic between the mobile device and at least one computing device, wherein the certificate is provided to the client device upon enrollment of the client device with a device management service; determine that the device certificate is unexpired and unrevoked; determine that the mobile device is authorized to access the email service of the user based upon the device certificate signature; and in response to determining that the device certificate signature is unexpired and unrevoked and that the mobile device is authorized to access the email service, send the identity assertion to the email client.

9. The system of claim 8, wherein the response indicating that the mobile device is unauthorized to access the email service of the user comprises a security assertion markup language (SAML) redirection.

10. The system of claim 9, wherein an operating system of the mobile device is Android.

11. The system of claim 8, wherein the device certificate installed on the mobile device by a management service upon enrollment of the mobile device with the management service as a managed device.

12. The system of claim 11, wherein the device certificate is installed as a portion of a single sign-on profile installed by the management service on the mobile device.

13. The system of claim 11, wherein the certificate is installed with a virtual private network (VPN) client installed by the management service on the mobile device.

14. The system of claim 8, wherein the identity provider determines that the mobile device is authorized to access the email service of the user by determining that the mobile device complies with at least one compliance rule or whether the mobile device is enrolled as a managed device with a management service.

15. A method, comprising: receiving, in at least one computing device, a request for an identity assertion from an email client, the request being generated in response to a redirection received in the email client from an authentication server; in response to determining that a mobile device executing the email client is unauthenticated, sending to the mobile device a response to the request indicating that the mobile device is unauthorized to access the email service; identifying a device certificate signature associated with the mobile device, the device certificate signature generated from a device certificate used to secure network traffic between the mobile device and at least one computing device, wherein the certificate is provided to the client device upon enrollment of the client device with a device management service; determining that the device certificate is unexpired and unrevoked; determining that the mobile device is authorized to access the email service of the user based upon the device certificate signature; and in response to determining that the device certificate signature is unexpired and unrevoked and that the mobile device is authorized to access the email service, send the identity assertion to the email client.

16. The method of claim 15, wherein the response indicating that the mobile device is unauthorized to access the email service of the user comprises a security assertion markup language (SAML) redirection.

17. The method of claim 16, wherein an operating system of the mobile device is Android.

18. The method of claim 15, wherein the device certificate is installed as a portion of a single sign-on profile installed by a management service on the mobile device.

19. The method of claim 18, wherein the certificate is installed as a portion of a single sign-on profile installed by the management service on the mobile device.

20. The method of claim 18, wherein the certificate is installed with a virtual private network (VPN) client installed by the management service on the mobile device.

* * * * *